(12) United States Patent
Hellwig et al.

(10) Patent No.: US 8,399,051 B1
(45) Date of Patent: Mar. 19, 2013

(54) METHOD FOR MAKING A PATTERNED PERPENDICULAR MAGNETIC RECORDING DISK HAVING A FEPT OR COPT CHEMICALLY ORDERED RECORDING LAYER

(75) Inventors: Olav Hellwig, San Jose, CA (US);
Jeffrey S. Lille, Sunnyvale, CA (US);
Andrew Thomas McCallum, San Jose, CA (US); Oleksandr Mosendz, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 7 days.

(21) Appl. No.: 13/248,086

(22) Filed: Sep. 29, 2011

(51) Int. Cl.
*B05D 5/12* (2006.01)
(52) U.S. Cl. .................................................. 427/131
(58) Field of Classification Search ............... 427/154, 427/129, 130, 131, 132
See application file for complete search history.

(56) References Cited

U.S. PATENT DOCUMENTS

| | | | |
|---|---|---|---|
| 6,541,131 B1 * | 4/2003 | Ristau | ............ 428/826 |
| 7,892,664 B2 | 2/2011 | Lu | |
| 2004/0185307 A1 | 9/2004 | Oikawa et al. | |
| 2010/0151275 A1 | 6/2010 | Shin et al. | |
| 2010/0159283 A1 | 6/2010 | Ibusuki et al. | |
| 2010/0214695 A1 * | 8/2010 | Isowaki et al. | ............ 360/135 |
| 2011/0051282 A1 * | 3/2011 | Fukushima | ............ 360/75 |
| 2011/0181984 A1 | 7/2011 | Okawa et al. | |

FOREIGN PATENT DOCUMENTS

JP       2006202451      8/2006

OTHER PUBLICATIONS

Chen et al., "Magnetic Properties and Microstructure of Isolated Fe-Pt Nanoparticle-Monolayer Assembly by Protective Coating", IEEE Transactions Magnetics vol. 41, No. 10 (Oct. 2005), pp. 3376-3378.
Takahashi et al., "Interfacial disorder in the L10 FePt particles capped with amorphous Al2O3", Appl. Phys. Lett., vol. 84, No. 3, Jan. 19, 2004, pp. 383-385.
Yu et al., "Effects of total thickness on (001) texture, surface morphology, and magnetic properties of [Fe/Pt]n multilayer films by monatomic layer deposition", J. Appl. Phys. 108, 073906 (2010).
Seki et al., "Improvement of Hard Magnetic Properties in Microfabricated L10-FePt Dot Arrays Upon Post-Annealing", IEEE Transactions on Magnetics, vol. 41 No. 10 (Oct. 2005), pp. 3604-3606.

(Continued)

*Primary Examiner* — Michael Cleveland
*Assistant Examiner* — Tabassom Tadayyon Eslami
(74) *Attorney, Agent, or Firm* — Thomas R. Berthold

(57) ABSTRACT

A method for making a bit-patterned-media (BPM) magnetic recording disk includes depositing a FePt (or CoPt) alloy recording layer, and then depositing a sealing layer on the FePt layer before high-temperature annealing. The high-temperature annealing causes the FePt to become substantially chemically-ordered in the $L1_0$ phase. After annealing, the sealing layer is removed. The sealing layer prevents nano-clustering and agglomeration of the FePt material at the surface of the FePt layer and the sealing layer, which would result in undesirable high surface roughness of the FePt, making patterning of the FePt layer difficult. The FePt layer can be patterned into the discrete islands for the BPM disk either before deposition of the sealing layer or after deposition and removal of the sealing layer. After patterning and removal of the sealing layer, the disk protective overcoat is deposited over the discrete data islands.

27 Claims, 12 Drawing Sheets

OTHER PUBLICATIONS

Shima et al., "Fabrication of L10 ordered FePt alloy films by monatomic layer sputter deposition", J. Appl. Phys., vol. 93, No. 10, Parts 2 & 3, May 15, 2003, pp. 7238-7240.

Kim et al., "FePt nanodot arrays with perpendicular easy axis, large coercivity, and extremely high density", Appl. Phys. Lett. 91, 172508 (2007).

Ishio et al., "L10 FePt thin films with [0 0 1] crystalline growth fabricated by SiO2 addition—rapid thermal annealing and dot patterning of the films", Journal of Magnetism and Magnetic Materials, doi:10.1016/j.jmmm.2010.12.014.

Krone et al., "Exchange coupled composite bit patterned media", Appl. Phys. Lett. 97, 082501 (2010).

* cited by examiner

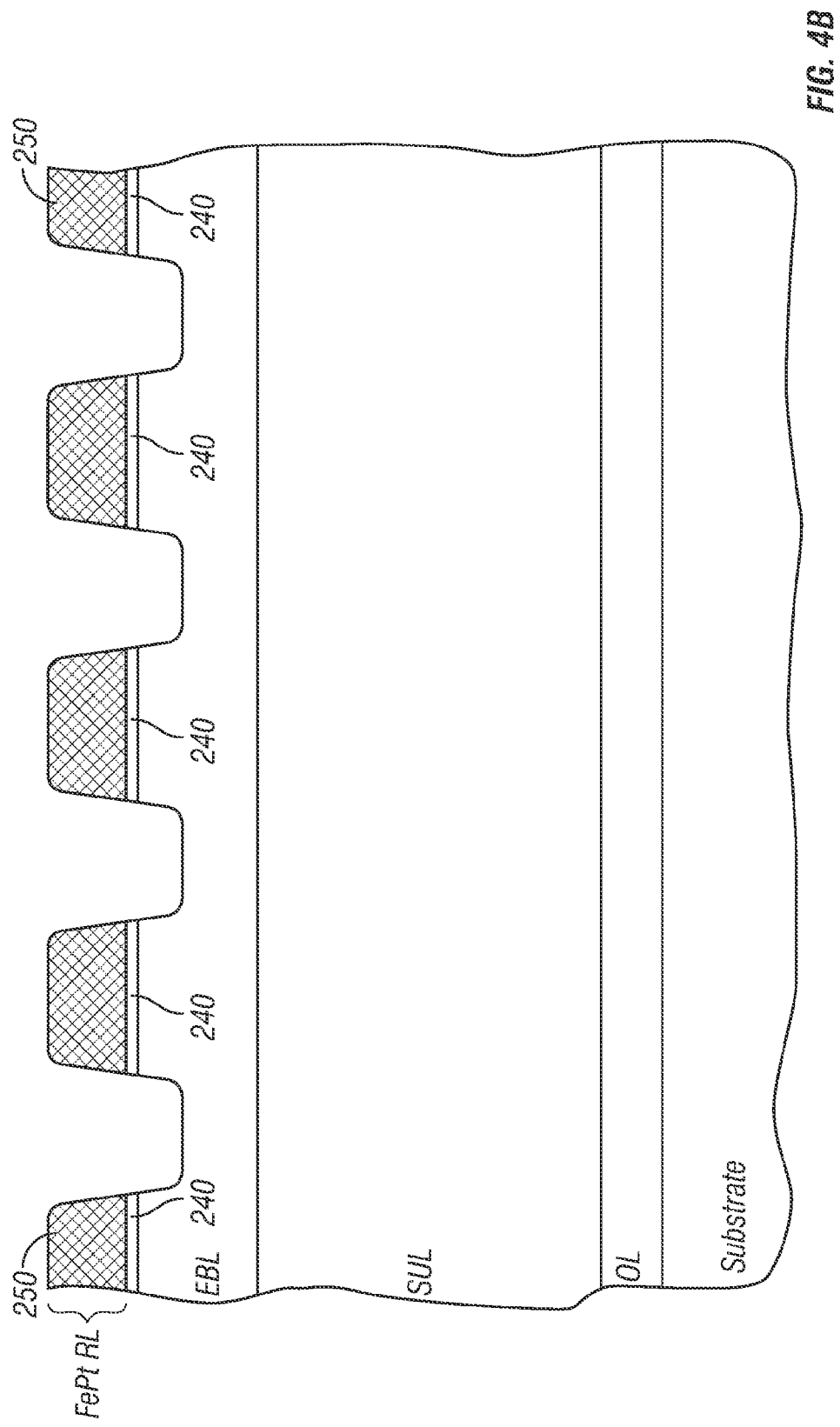

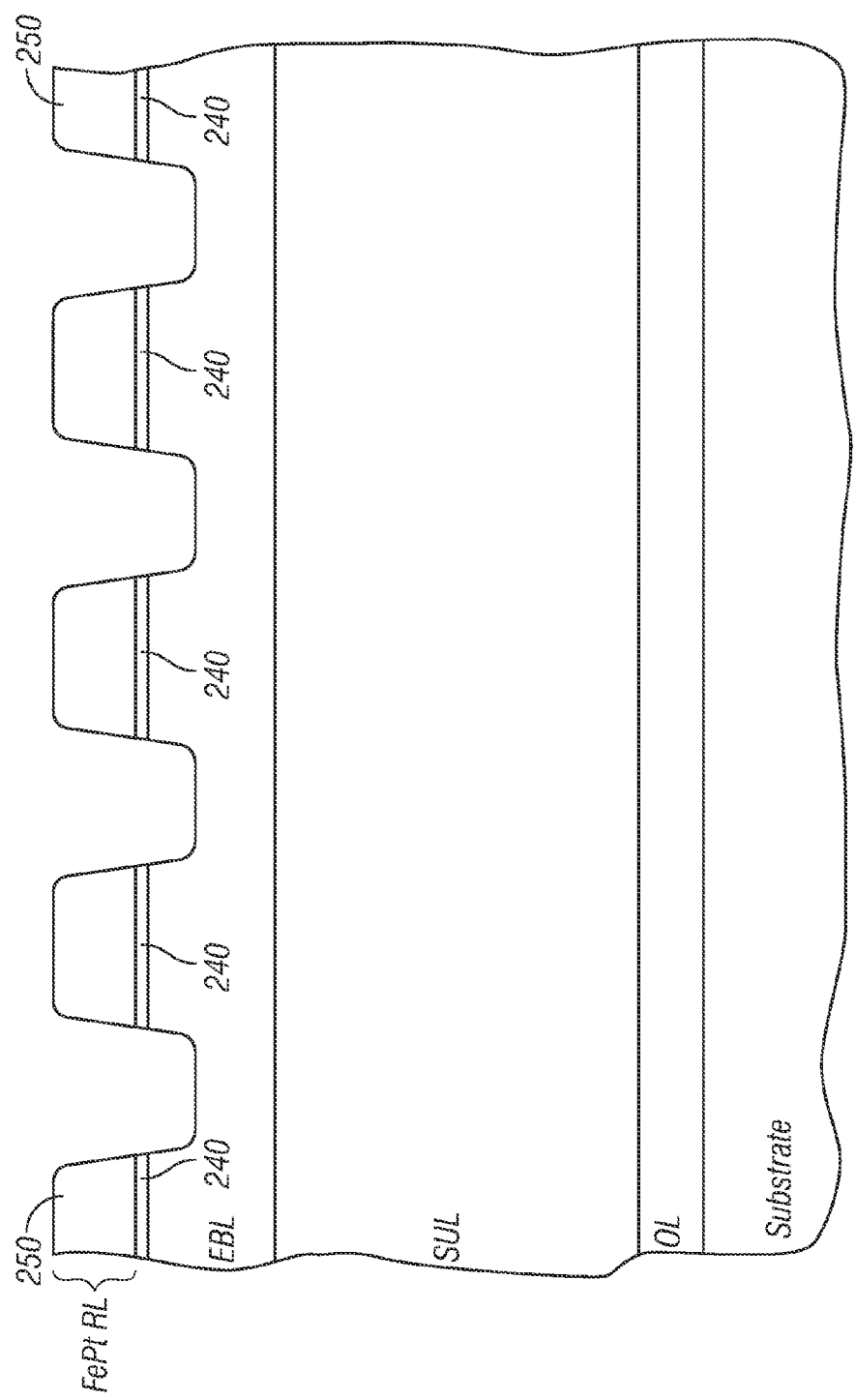

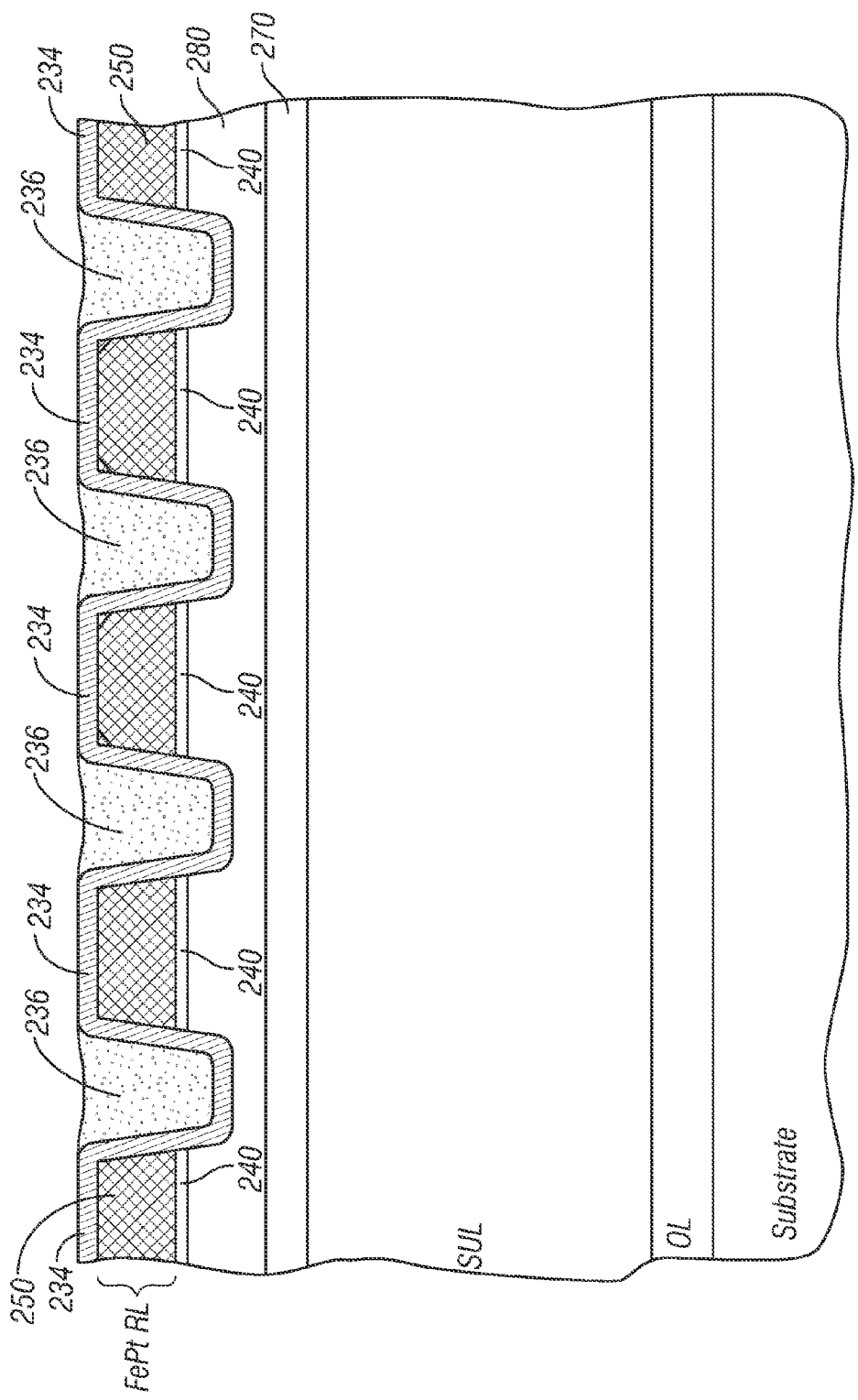

METHOD FOR MAKING A PATTERNED PERPENDICULAR MAGNETIC RECORDING DISK HAVING A FEPT OR COPT CHEMICALLY ORDERED RECORDING LAYER

BACKGROUND OF THE INVENTION

1. Field of the Invention

This invention relates generally to patterned perpendicular magnetic recording media, such as disks for use in magnetic recording hard disk drives, and more particularly to patterned disks with chemically-ordered FePt or CoPt recording layers.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned media (BPM), the magnetic recording layer on the disk is patterned into small isolated data islands arranged in concentric data tracks. While BPM disks may be longitudinal magnetic recording disks, wherein the magnetization directions are parallel to or in the plane of the recording layer, perpendicular magnetic recording disks, wherein the magnetization directions are perpendicular to or out-of-the-plane of the recording layer, will likely be the choice for BPM because of the increased data density potential of perpendicular media. To produce the magnetic isolation of the patterned data islands, the magnetic moment of the spaces between the islands are destroyed or substantially reduced to render these spaces essentially nonmagnetic. Alternatively, the media may be fabricated so that there is no magnetic material in the spaces between the islands.

Nanoimprint lithography (NIL) has been proposed to form the desired pattern of islands on BPM disks. NIL is based on deforming an imprint resist layer by a master template or mold having the desired nano-scale pattern. The master template is made by a high-resolution lithography tool, such as an electron-beam tool. The substrate to be patterned may be a disk blank formed of an etchable material, like quartz, glass or silicon, or a disk blank with the magnetic recording layer, and any required underlayers, formed on it as continuous layers. Then the substrate is spin-coated with the imprint resist, such as a thermoplastic polymer, like poly-methylmethacrylate (PMMA). The polymer is then heated above its glass transition temperature. At that temperature, the thermoplastic resist becomes viscous and the nano-scale pattern is reproduced on the imprint resist by imprinting from the template at a relatively high pressure. Once the polymer is cooled, the template is removed from the imprint resist leaving an inverse nano-scale pattern of recesses and spaces on the imprint resist. As an alternative to thermal curing of a thermoplastic polymer, a polymer curable by ultraviolet (UV) light, such as MonoMat available from Molecular Imprints, Inc., can be used as the imprint resist. The patterned imprint resist layer is then used as an etch mask to form the desired pattern of islands in the underlying substrate.

The islands in BPM need to be sufficiently small and of sufficient magnetic quality to support high bit areal densities (e.g., 500 Gb/in$^2$ and beyond). For example, to achieve a bit areal density of 1 Tb/in$^2$, the data islands will have diameters approximately 15 to 20 nm with the nonmagnetic spaces between the islands having widths of about 10 to 15 nm. It is thus important that as the size of the islands decreases, the thermal stability of the islands is maintained.

Another critical issue for the development of BPM is that the switching field distribution (SFD) (i.e., the island-to-island variation of the coercive field) needs to be narrow enough to insure exact addressability of individual islands without overwriting adjacent islands. Ideally the SFD width would be zero, meaning that all the bits would switch at the same write field strength. The SFD has many origins, such as variations in the size, shape and spacing of the patterned islands, the intrinsic magnetic anisotropy distribution of the magnetic material used, and dipolar interactions between adjacent islands. Additionally, it has been found that the SFD broadens (that is, the bit-to-bit variation in the coercive field increases) as the size of the magnetic islands is reduced, which limits the achievable bit areal density of BPM.

Chemically-ordered FePt and CoPt alloys with high anisotropy field ($H_k$) and perpendicular magnetic anisotropy have been proposed as the magnetic recording layer for BPM. Chemically-ordered alloys of FePt and CoPt ordered in $L1_0$ are known for their high magneto-crystalline anisotropy and magnetization, properties that are desirable for high-density magnetic recording materials. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt and CoPt alloys require high-temperature annealing to achieve the desired chemical ordering to the $L1_0$ phase. However, the annealing results in surface roughness which makes patterning of the FePt into the discrete islands difficult and results in a high value of SFD.

What is needed is a method for making a BPM disk with a chemically-ordered high-$H_k$ FePt or CoPt alloy recording layer that does not result in surface roughness of the FePt or CoPt layer during the manufacturing process.

SUMMARY OF THE INVENTION

The invention is a method for making a BPM disk with a chemically-ordered high-$H_k$ FePt or CoPt alloy recording layer. The FePt (or CoPt) layer is sputter deposited onto a seed layer structure while the disk substrate is either at room temperature or is maintained at an elevated temperature less than about 400° C. Within this temperature range the FePt alloy does not become fully chemically ordered. A sealing layer is then deposited onto the FePt layer. The sealing layer may be any material that is not substantially chemically reactive with the FePt and does not intermix with the Fe and Pt, and which can be readily removed, preferably by reactive-ion-etching (RIE). After deposition of the sealing layer, the structure is annealed, preferably at a temperature between 400° C. and 800° C., for about 1-30 min. The high-temperature annealing causes the FePt to become substantially chemically-ordered in the $L1_0$ phase, and assures that the high anisotropy field $H_k$ can be achieved. After annealing, the sealing layer is removed, preferably by RIE, or alternatively by ion milling. The sealing layer has been found to prevent nanoclustering and agglomeration of the FePt material at the surface of the FePt layer and the sealing layer, which would result in undesirable high surface roughness of the FePt and also result in a high value of SFD. The FePt layer can be patterned into the discrete islands for the BPM disk either before deposition of the sealing layer or after deposition and removal of the sealing layer. After patterning and removal of the sealing layer, the disk protective overcoat is deposited over the discrete data islands. An important aspect of the invention is that after the high-temperature annealing, the sealing layer must be removed prior to deposition of the protective overcoat.

BRIEF DESCRIPTION OF THE DRAWING

FIGS. 4A-4C are sectional views of a portion of a disk structure at various phases of the method of the invention.

FIGS. 6A-6C are sectional views of a portion of a disk structure at various phases of an alternative embodiment of the method of the invention.

FIG. 7 is a sectional view of a thermally-assisted recording (TAR) disk made according to the method of the invention.

DETAILED DESCRIPTION OF THE INVENTION

Figure 1:
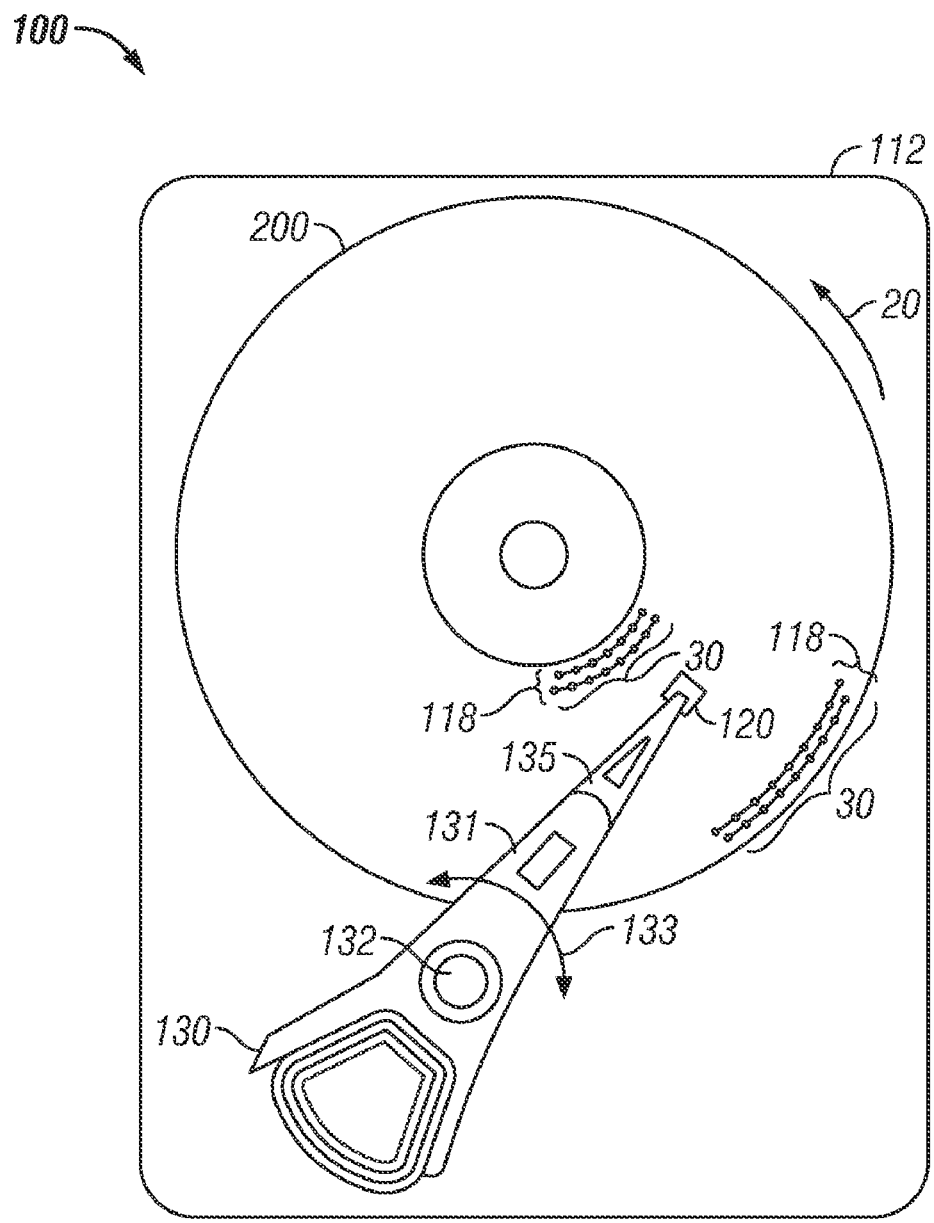
FIG. 1 is a top view of a perpendicular magnetic recording disk drive with bit-patterned media (BPM) and shows the patterned data islands arranged in concentric circular data tracks according to the prior art.

FIG. 1 is a top view of a patterned-media magnetic recording disk drive 100 with a patterned-media magnetic recording disk 200. The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and read/write head associated with each surface of each disk.

The patterned-media magnetic recording disk 200 includes a hard or rigid disk substrate and discrete data islands 30 of magnetizable material on the substrate. The data islands 30 are arranged in radially-spaced circular tracks 118, with only a few islands 30 and representative tracks 118 near the inner and outer diameters of disk 200 being shown in FIG. 1. The islands 30 are depicted as having a circular shape but the islands may have other shapes, for example generally rectangular, oval or elliptical. As the disk 200 rotates in the direction of arrow 20, the movement of actuator 130 allows the read/write head on the trailing end of slider 120 to access different data tracks 118 on disk 200.

Figure 2:
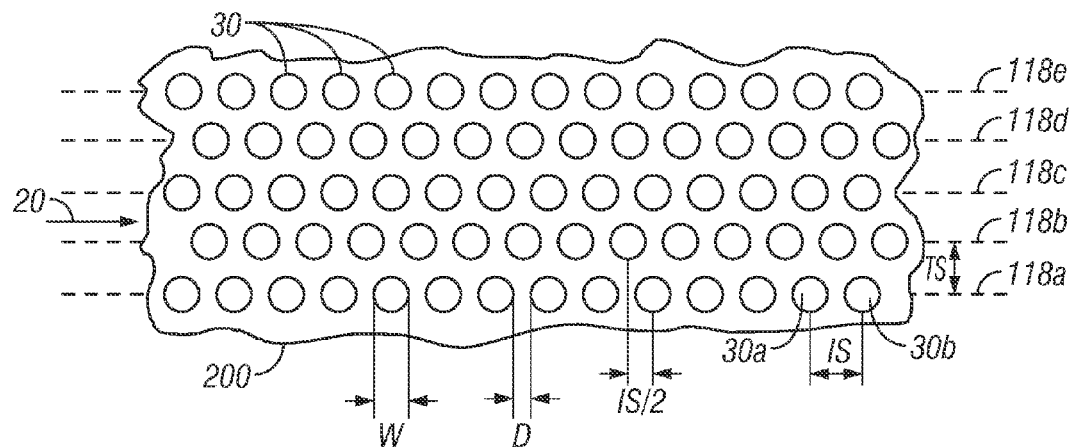
FIG. 2 is a top view of an enlarged portion of a prior art BPM disk showing the detailed arrangement of the data islands.

FIG. 2 is a top view of an enlarged portion of disk 200 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b. Each island has a lateral dimension W parallel to the plane of the disk 200, with W being the diameter if the islands have a circular shape. The islands may have other shapes, for example generally rectangular, oval or elliptical, in which case the dimension W may be considered to be the smallest dimension of the non-circular island, such as the smaller side of a rectangular island. The adjacent islands are separated by nonmagnetic regions or spaces, with the spaces having a lateral dimension D. The value of D may be greater than the value of W.

BPM disks like that shown in FIG. 2 may be perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a non-ferromagnetic material, such as a dielectric, or a material that has no substantial remnant moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 3A:
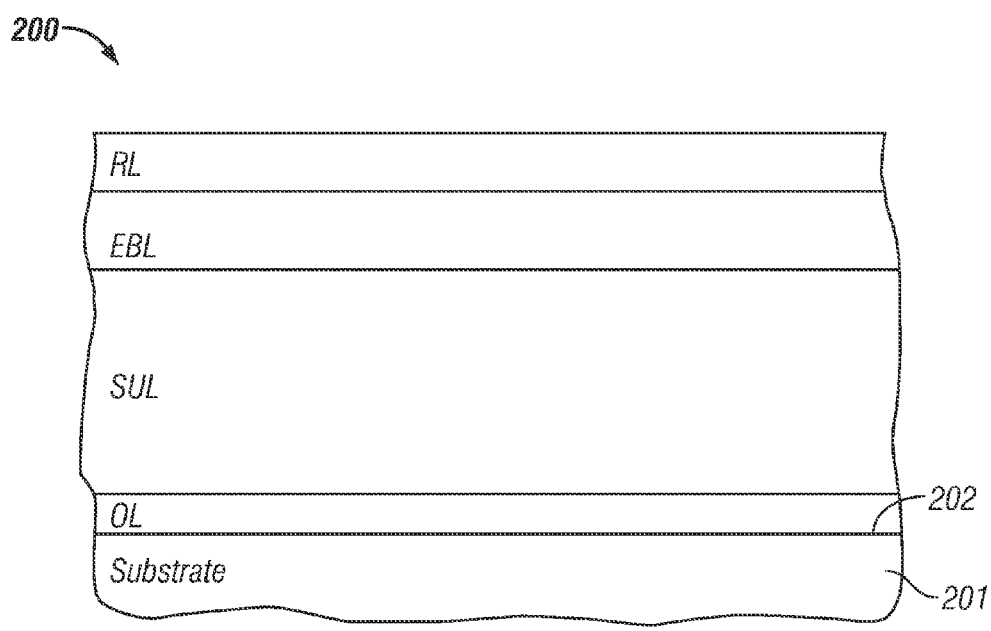
FIGS. 3A-3C are sectional views of a BPM disk at various stages of etching and planarizing the disk according to the prior art.

FIG. 3A is a sectional view showing the disk 200 according to the prior art before lithographic patterning and etching to form the BPM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon, canasite or silicon-carbide. An adhesion layer or onset layer (OL) for the growth of the SUL may be an AlTi alloy or a similar material with a thickness of about 2-10 nm is deposited on substrate surface 202.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

An exchange-break layer (EBL) is typically located on top of the SUL. It acts to break the magnetic exchange coupling between the magnetically permeable films of the SUL and the RL and also serves to facilitate epitaxial growth of the RL. The EBL may not be necessary, but if used it can be a non-magnetic titanium (Ti) layer; a non-electrically-conducting material such as Si, Ge and SiGe alloys; a metal such as Cr, Ru, W, Zr, Nb, Mo, V, Ta and Al; a metal alloy such as NiW, NiTa, CrTi and NiP; an amorphous carbon such as $CN_x$, $CH_x$ and C; or oxides, nitrides or carbides of an element selected from the group consisting of Si, Al, Zr, Ti, and B. The EBL may have a thickness in the range of about 1 to 40 nm.

The disk of FIG. 3A is lithographically patterned, for example by a nanoimprinting process. In nanoimprinting, a master template is fabricated, for example by direct e-beam writing, to have the desired pattern of data islands and nonmagnetic regions. A thin film of imprint resist (i.e., a thermoplastic polymer) is spin coated onto the disk. Then the master template with its predefined pattern is brought into contact with the imprint resist film and the template and disk are pressed together and heat is applied. When the imprint resist polymer is heated above its glass transition temperature, the pattern on the template is pressed into the resist film. After cooling, the master template is separated from the disk and the patterned resist is left on the RL. The patterned imprint resist is then used as an etch mask. Reactive-ion-etching (RIE) or ion milling can be used to transfer the pattern in the imprint resist to the underlying disk to form the data islands and nonmagnetic regions.

Figure 3B:
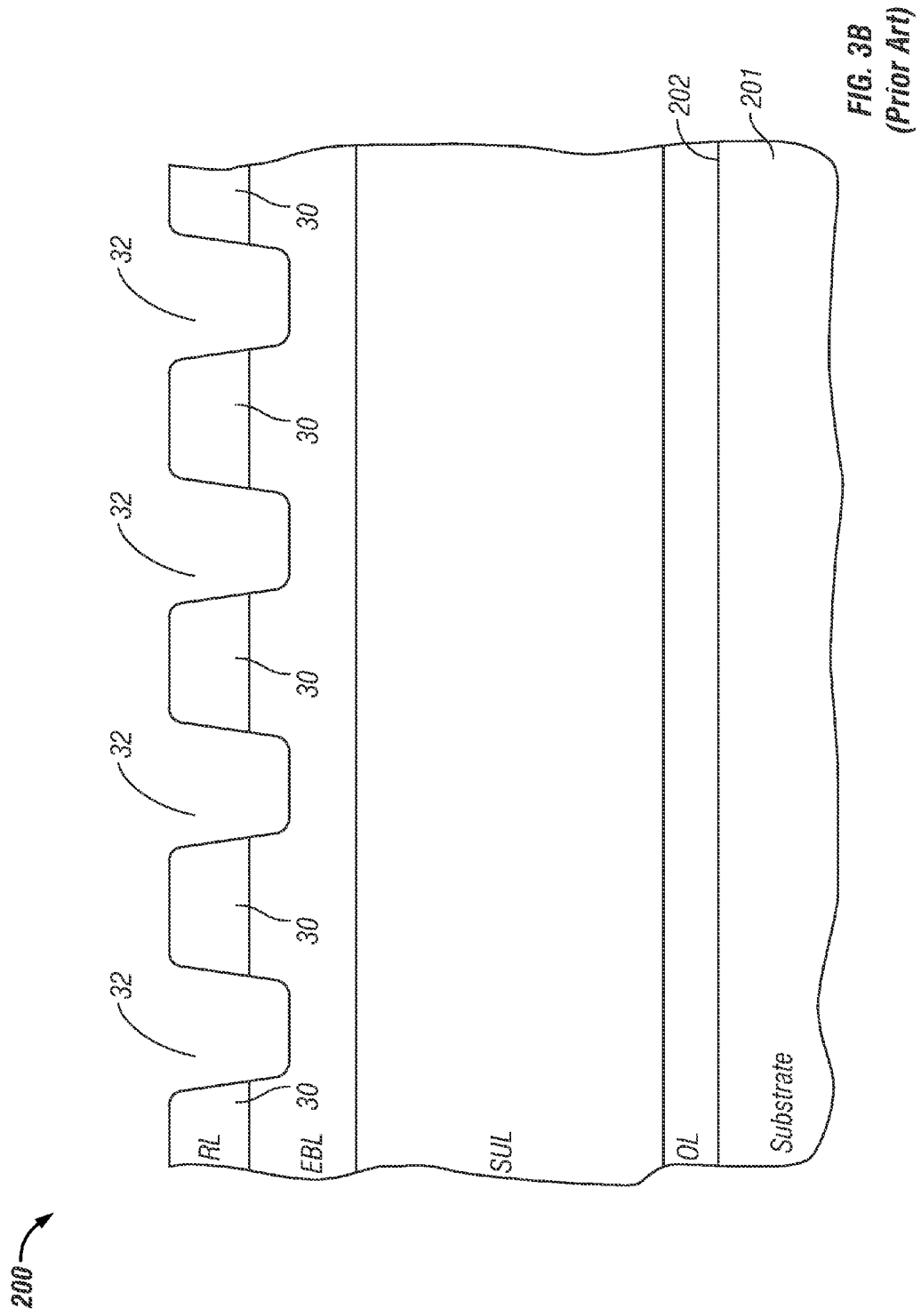

FIG. 3B is a sectional view of the disk 200 after lithographic patterning and etching. After etching, elevated lands 30 of RL material and grooves or recesses 32 are formed above the substrate surface 202. The typical depth of the recesses 32, which is also essentially the height of the lands 30, is in the range of about 4 to 50 nm and the typical width of the recesses is in the range of about 4 to 50 nm. In the example shown in FIG. 3B, the etching has been performed to a depth such that all of the RL material and a portion of the EBL material has been removed from the regions of the recesses 32. However, alternatively the etching can be performed to a depth such that only a portion of the RL material is removed. In that case, there would be a layer of RL material below the lower surface of the recesses 32.

Figure 3C:
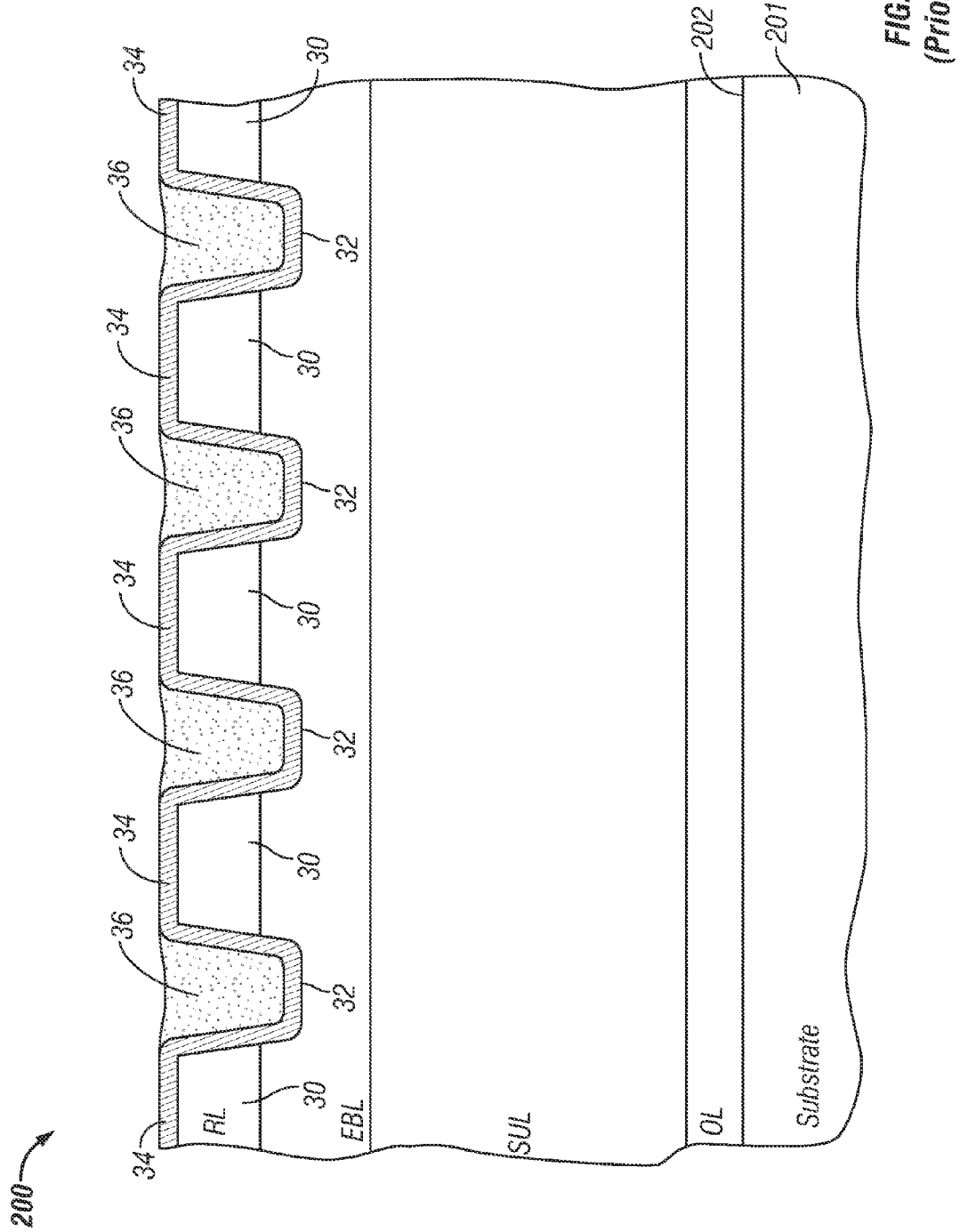

FIG. 3C is a sectional view of the etched disk 200 of FIG. 3B after deposition of a protective overcoat 34 into the recesses 32 and over the tops of lands 30 and after deposition and chemical-mechanical-polishing (CMP) of fill material 36 in the recesses 32. The protective overcoat 34 is preferably a layer of amorphous carbon, like diamond-like carbon (DLC). The amorphous carbon or DLC may also be hydrogenated and/or nitrogenated, as is well-known in the art. Alternatively, the protective overcoat 34 may be a silicon nitride, such as $Si_3N_4$ or $SiN_x$. The fill material 36 may be $SiO_2$, a non-oxide material such as C or $SiN_x$, or a polymeric material. The CMP results in essentially a planarized disk surface. An optional additional layer of protective overcoat (not shown) may then be deposited on the planarized surface, followed by a layer of conventional liquid lubricant (not shown).

This invention relates to a method for making a patterned perpendicular media in which the RL includes a high-$H_k$ chemically-ordered FePt alloy (or CoPt alloy) with perpendicular magnetic anisotropy. Chemically-ordered alloys of FePt (and CoPt) ordered in $L1_0$ are known for their high magneto-crystalline anisotropy and magnetization, properties that are desirable for high-density magnetic recording materials. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The chemically-ordered FePt alloy may also be a pseudo-binary alloy based on the FePt $L1_0$ phase, e.g., (Fe(y)Pt(100-y))-X, where y is between about 45 and 55 atomic percent and the element X may be Ni, Au, Cu, Pd or Ag and is present in the range of between about 0% to about 20% atomic percent. While the pseudo-binary alloy in general has similarly high anisotropy as the binary alloy FePt, it allows additional control over the magnetic and other properties of the RL. For example, the addition of Cu reduces the Curie temperature by about 100-150 K. While the method will be described for media with a FePt RL, the method is also fully applicable to media with a CoPt (or a pseudo-binary CoPt—X alloy based on the CoPt $L1_0$ phase) RL.

Figure 4A:
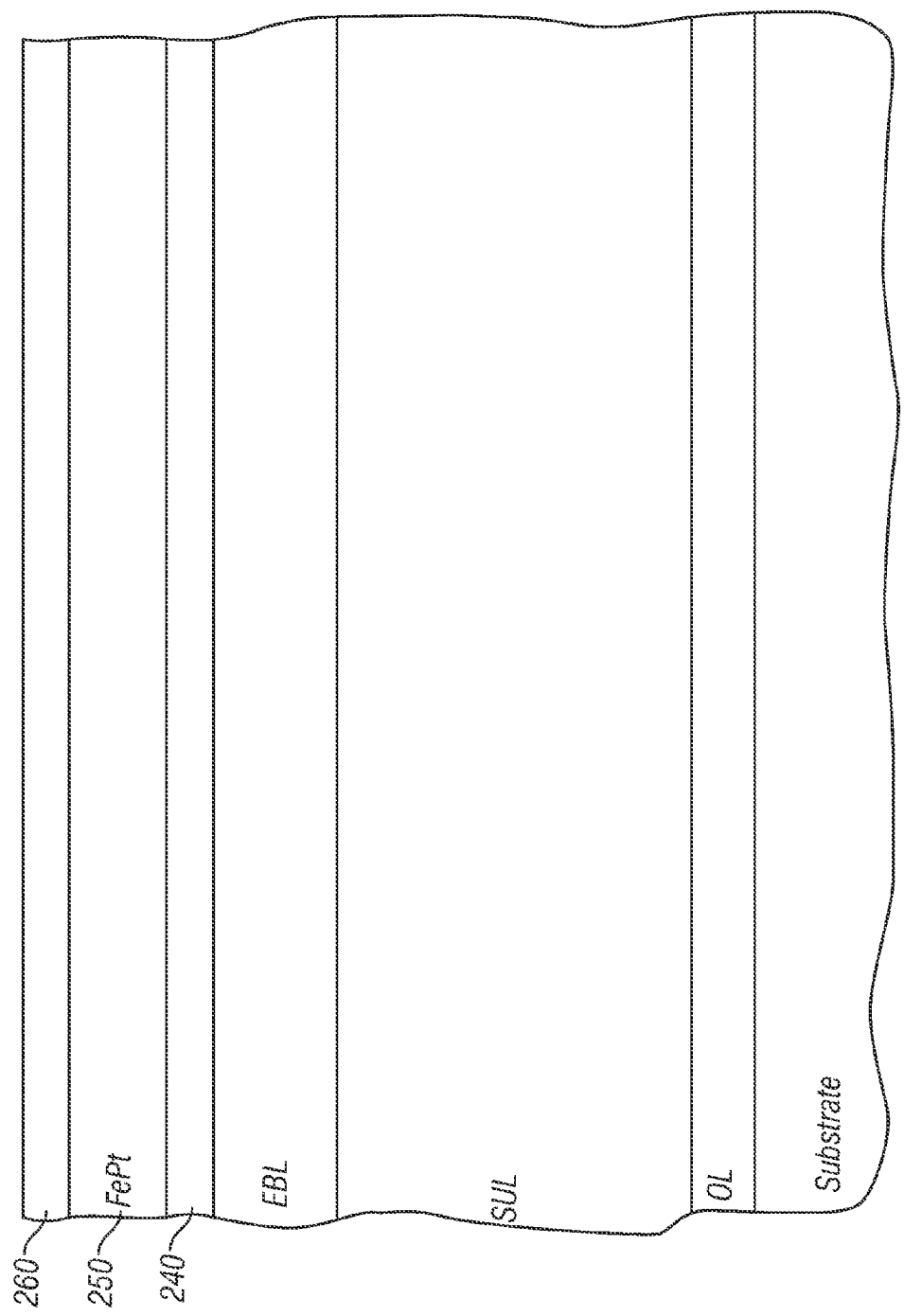

FIG. 4A is a sectional view at a first phase of the method showing a portion of the substrate with the SUL and EBL on it. A seed layer structure 240 is deposited on the EBL to facilitate the growth of the FePt layer 250 so as to encourage perpendicular magnetic anisotropy. The seed layer structure 240 may be a bilayer of a lower CrRu layer and an upper Pt layer on the CrRu layer. MgO, TiN and TiC may also function as suitable seed layers. The total thickness of the EBL and seed layer structure 240 is preferably in the range of 1 nm to 25 nm. The FePt layer 250 is deposited on the seed layer structure 240 to a thickness in the range of about 3 to 10 nm. The FePt layer 250 will ultimately become a hard (high-HO chemically-ordered generally equiatomic binary FePt alloy based on the $L1_0$ phase that will function as the RL.

In the method of this invention, the FePt layer 250 is sputter deposited onto the seed layer structure 240 while the disk substrate is either at room temperature (approximately 20° C.) or is maintained at an elevated temperature less than about 400° C. Within this temperature range the FePt alloy does not become fully chemically ordered and a subsequent high-temperature annealing is required. The FePt may be sputter deposited from a single composite target having generally equal atomic amounts of Fe and Pt or co-sputtered from separate targets. As an alternative method for forming the FePt layer 250, sequential alternating layers of Fe and Pt can be deposited by sputter depositing from separate Fe and Pt targets, using a shutter to alternately cover the Fe and Pt targets, with each Fe and Pt layer having a thickness in the range of about 0.15 nm to 0.25 nm to achieve a total thickness of about 3 to 10 nm for layer 250.

A sealing layer 260 is then deposited, typically by sputtering, onto FePt layer 250. The purpose of the sealing layer is to prevent surface roughness of the FePt layer which has been found to occur after subsequent high-temperature annealing. The sealing layer may be any material that is not substantially chemically reactive with the FePt and does not intermix with the Fe and Pt. Certain materials, like tungsten (W) have been determined to be unacceptable as sealing layers because the W intermixes with the Fe and Pt during the annealing. The material for the sealing layer 260 should also be a material which can be readily removed, preferably by reactive-ion-etching (RIE). Preferred materials include alumina ($Al_2O_3$), silicon dioxide ($SiO_2$), a silicon nitride ($SiN_x$), a titanium nitride (TiN), and diamond-like carbon (DLC). The sealing layer 260 is deposited to a thickness preferably between about 1.5 to 15 nm.

After deposition of the sealing layer 260, the structure is annealed, preferably at a temperature between 400° C. and 800° C. The annealing time can be for about 1-30 min or longer. Rapid thermal annealing (RTA), wherein the annealing time is very short (about 2 to 60 seconds) and the temperature is ramped up very quickly, may also be used. The annealing causes the FePt to become substantially chemically-ordered in the $L1_0$ phase, and assures that the high anisotropy field $H_k$ can be achieved. The anisotropy field is preferably between about 30 and 150 kOe. The sealing layer has been found to prevent nanoclustering, and agglomeration of the FePt material at the surface of the FePt layer 250 and the sealing layer 260, which would result in undesirable high surface roughness of the RL. This would make subsequent patterning of the RL difficult and also result in a high value of SFD.

After annealing, the sealing layer 260 is removed, preferably by RIE, or alternatively by ion milling. If the sealing layer 260 is formed of $SiO_2$ or $SiN_x$ it can be removed by conventional RIE using fluorine chemistry. If the sealing layer 260 is formed of alumina it can be removed by conventional RIE using chlorine chemistry. If the sealing layer 260 is formed of DLC it can be removed by conventional RIE using oxygen chemistry. The removal of the sealing layer 260 leaves the FePt RL with a very smooth surface. The upper surface of the FePt layer 250 should have a root-mean-square (RMS) peak-to-peak surface roughness of less than 2 nm for subsequent patterning into the discrete data islands. This is because it is difficult to pattern a rough surface with large lateral layer thickness variations. Also a smooth surface is desirable because the rougher the surface of the FePt islands, the greater the SFD. The variation in volume of FePt material from island to island has to be as small as possible to assure a low value of SFD.

Figure 5A:
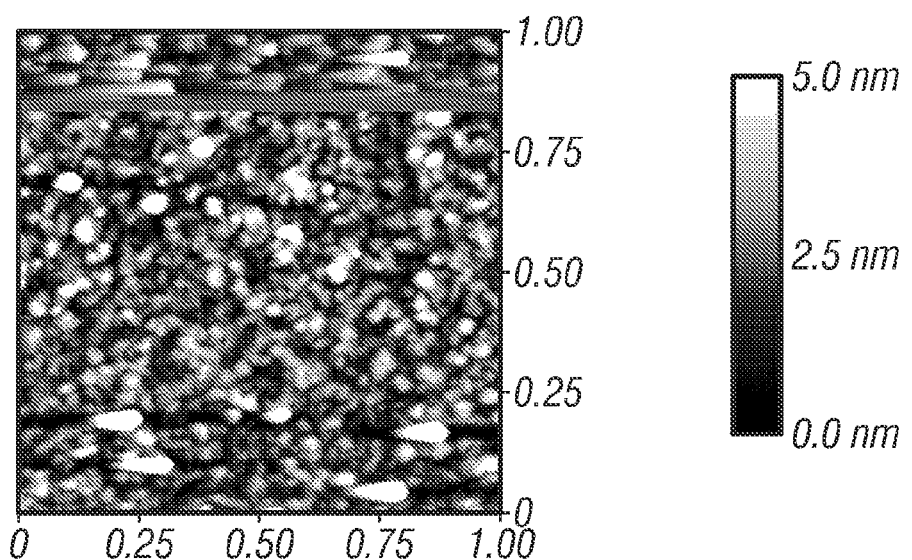
FIG. 5A is an atomic force microscopy (AFM) image of the surface of a chemically-ordered FePt layer after high-temperature annealing without a sealing layer.
Figure 5B:
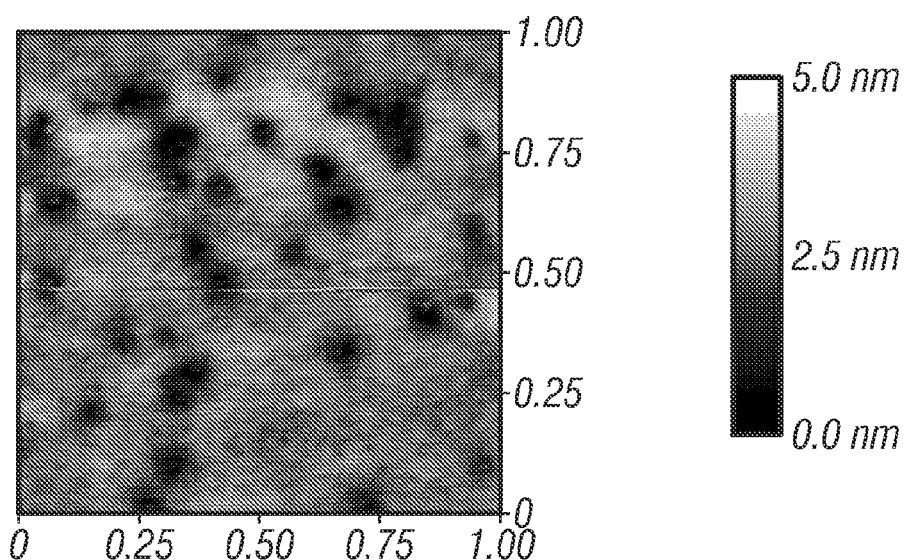
FIG. 5B is an AFM image of the surface of a chemically-ordered FePt layer after annealing with a sealing layer and after removal of the sealing layer.

FIGS. 5A-5B are AFM images that illustrate the substantial improvement obtained with the method of this invention. The term Rp is the distance between the average height of the AFM scan and the highest points within a 1 micron by 1 micron area of the AFM scan. FIG. 5A shows the surface of a FePt layer after high-temperature annealing without a sealing layer. The measured Rp was 10.4 nm. FIG. 5B shows the surface of a FePt layer after high-temperature annealing with a 10 nm thick $SiO_2$ sealing layer and subsequent removal by RIE. The measured Rp was 1.4 nm.

Figure 4C:
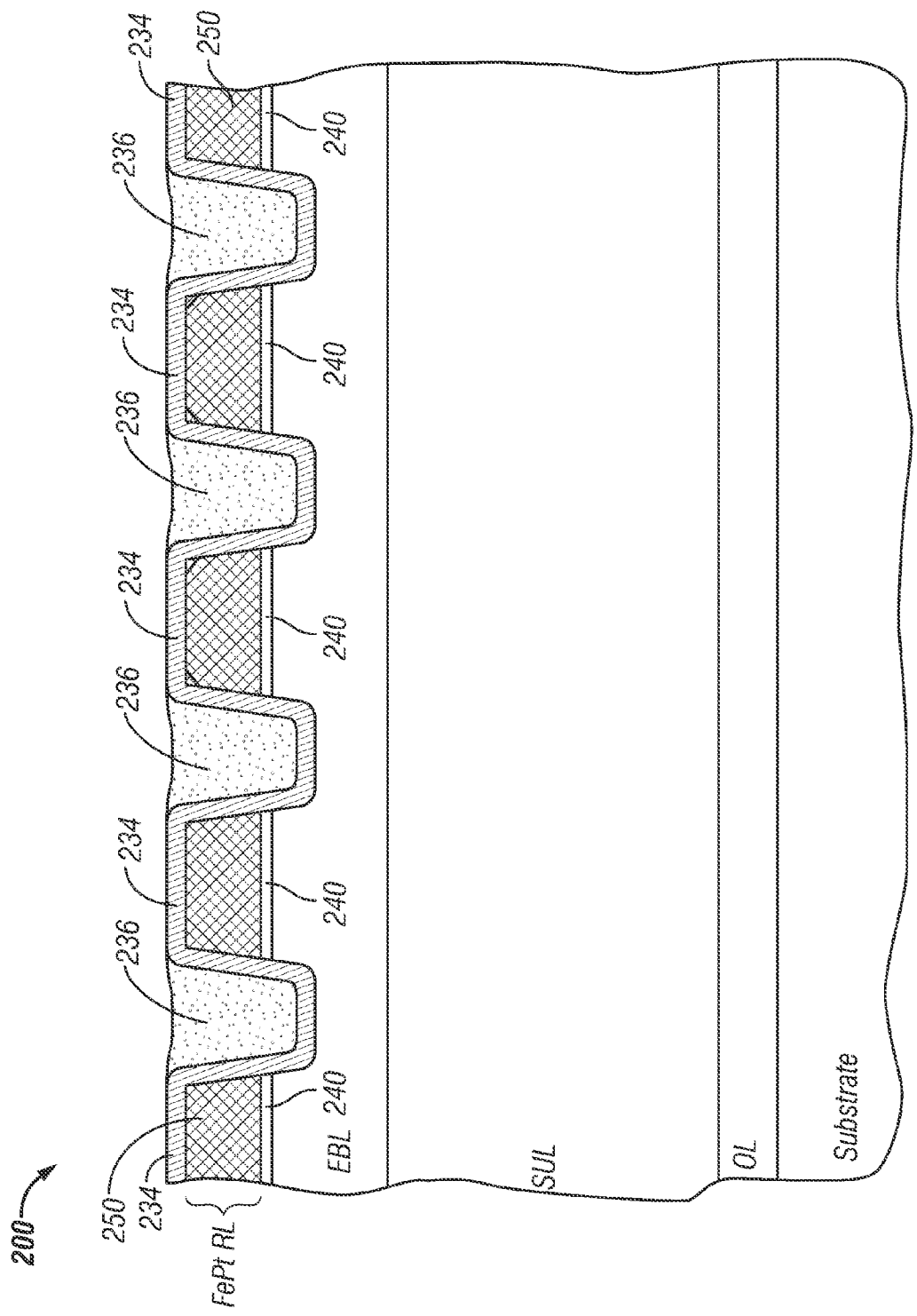

After the high-temperature annealing and removal of the sealing layer, the disk structure with the exposed FePt RL is patterned into discrete data islands. The disk structure at this phase of the process is depicted in FIG. 4B. The FePt islands are depicted by cross-hatching to represent that the FePt layer 250 has become substantially chemically-ordered in the $L1_0$ phase by the previous high-temperature annealing. Then as shown in FIG. 4C, the protective overcoat 234 is deposited over the FePt islands and into the etched recesses between the islands, and fill material 236 is deposited into the recesses and planarized, typically by CMP. The protective overcoat 234 is preferably a layer of amorphous carbon, like diamond-like carbon (DLC). The amorphous carbon or DLC may also be hydrogenated and/or nitrogenated, as is well-known in the art. Alternatively, the protective overcoat 234 may be a silicon nitride, such as $Si_3N_4$ or $SiN_x$. The fill material 36 may be $SiO_2$ or a polymeric material. The CMP results in essentially a planarized disk surface. An optional additional layer of protective overcoat (not shown) may then be deposited on the planarized surface, followed by a layer of conventional liquid lubricant (not shown).

Figure 6A:
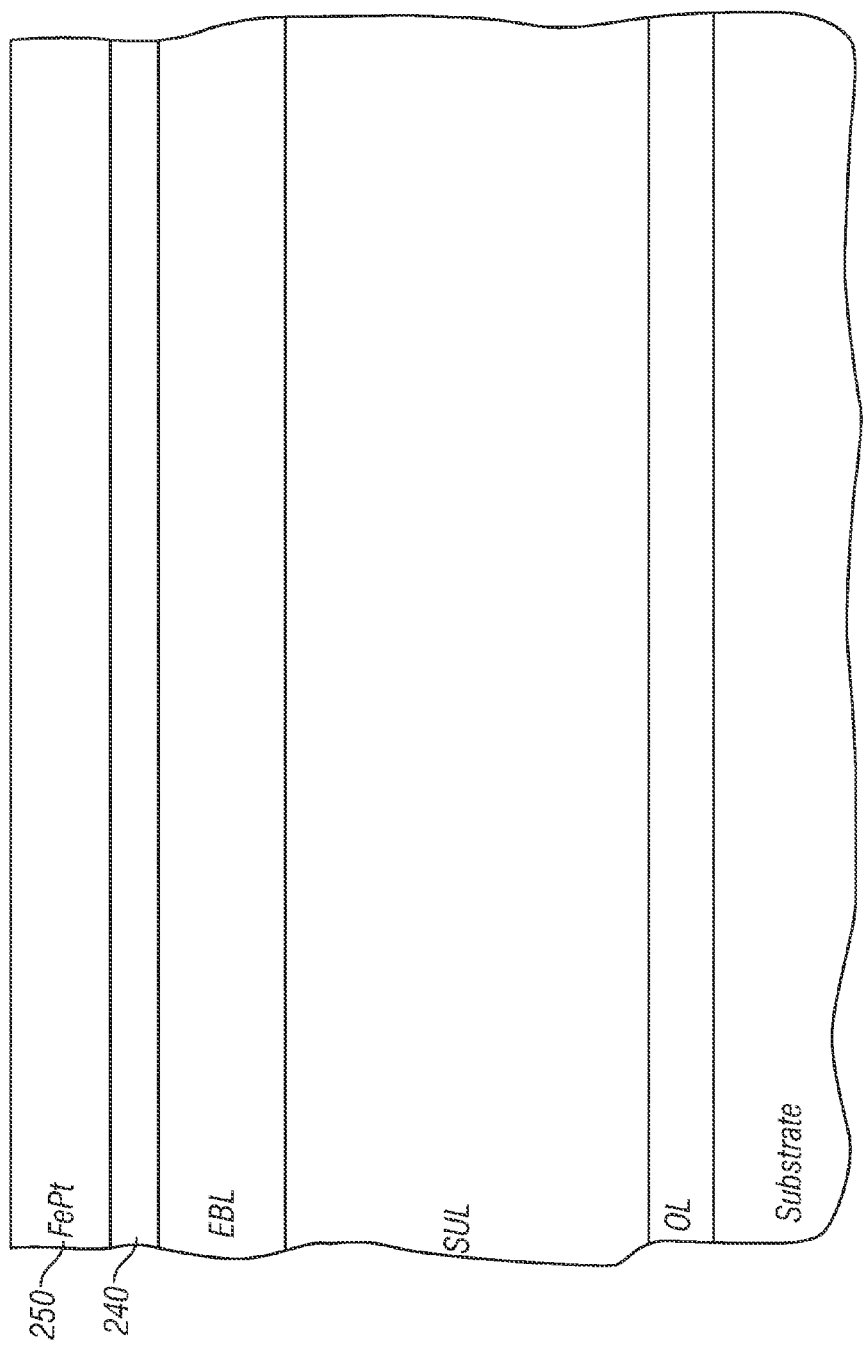
Figure 6C:
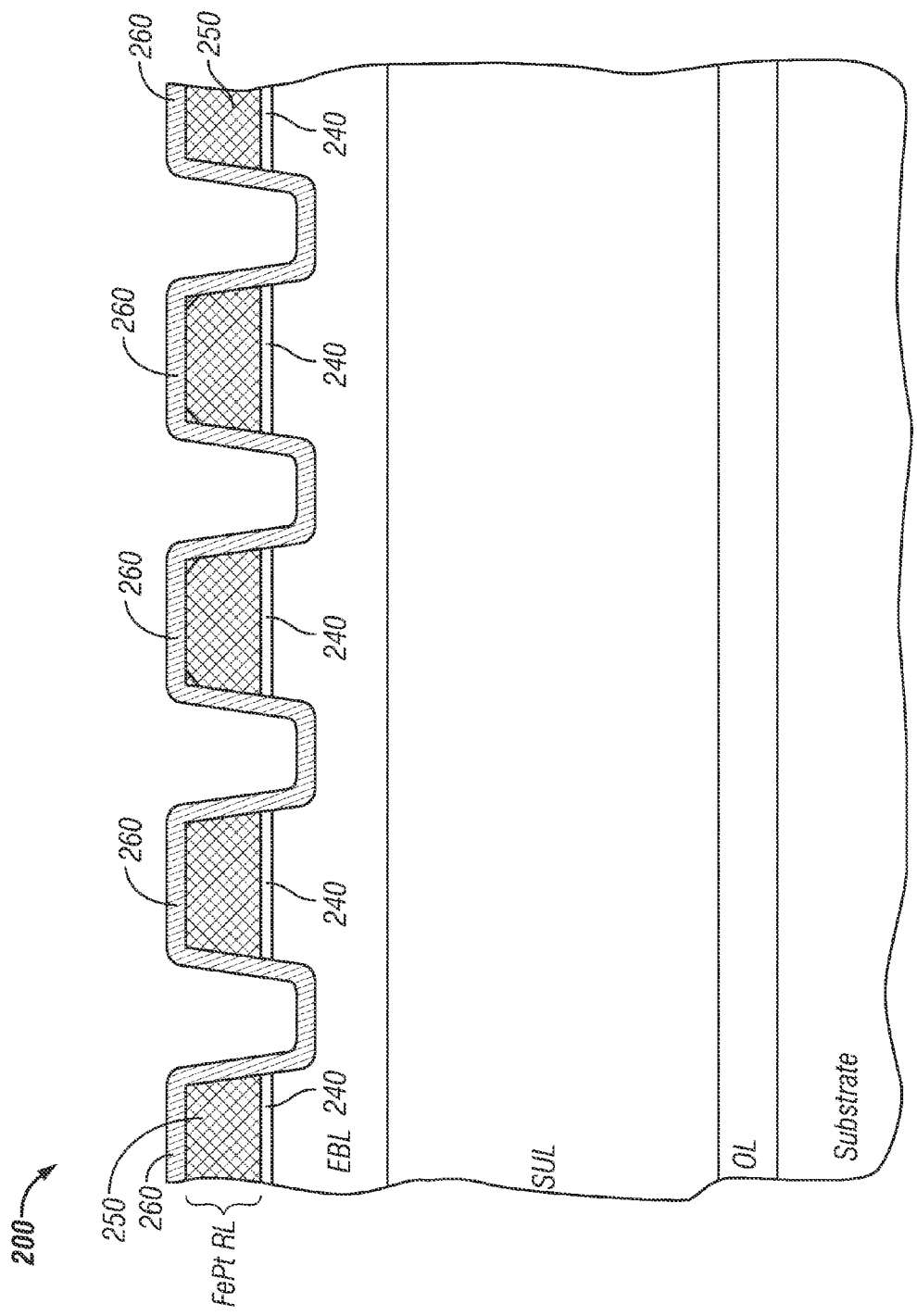

An alternative embodiment of the method is illustrated in FIGS. 6A-6C. The seed layer 240 and FePt layer 250 are deposited on the EBL as before, but the sealing layer is not deposited, leaving the disk structure as shown in FIG. 6A. Then the disk structure is patterned into the discrete islands of the FePt material, but not yet chemically-ordered into the $L1_0$ phase, as shown in FIG. 6B. The sealing layer 260 is then deposited over the FePt islands and into the recesses between the islands and the high-temperature annealing is performed as before, as shown in FIG. 6C. This results in the FePt becoming chemically-ordered into the $L1_0$ phase, as represented by the cross-hatching of layer 250. The sealing layer 260 is then removed, after which the protective overcoat and fill material are deposited, resulting in the structure substantially as shown in FIG. 4C.

An important aspect of the invention is that after the high-temperature annealing, the sealing layer must be removed prior to deposition of the overcoat. This applies even if the overcoat is formed of the same material as the sealing layer, for example DLC or $SiN_x$. The properties required for overcoats, e.g., scratch resistivity, bonding to the lubricant, and very high smoothness, are not compatible with heating the overcoat above 400° C. For example, it has been discovered that DLC at least partially converts to graphite and SiNx dissociates at temperatures greater than 400° C. Additionally, the sealing layer is typically thicker than the overcoat because it should be as thick as necessary to suppress any surface diffusion of the FePt, while the overcoat should be as thin as possible to minimize the spacing between the RL and the read/write head.

While the FePt layer alone may function as the RL, a soft (lower $H_k$) magnetic layer may be deposited directly on the chemically-ordered FePt layer prior to patterning. The soft magnetic layer improves the writability of the underlying FePt layer through a spring switching mechanism. Exchange-spring media, also called exchange-coupled composite (ECC) media, are well-known for perpendicular magnetic recording. An ECC perpendicular recording material is a composite of two or more ferromagnetically exchange-coupled magnetic layers with substantially different anisotropy fields ($H_k$). In the presence of a uniform write field the magnetization of the lower-$H_k$ soft layer will rotate first and assist in the reversal of the magnetization of the higher-$H_k$ FePt layer. Pending application Ser. Nos. 11/751,823; 12/412,403 and 12/964,643, all assigned to the same assignee as this application, describe various types of perpendicular BPM with data islands formed of ECC material. The soft magnetic layer may be a multilayer of a series of Co/X bilayers, where X is Pt, Pd or Ni. The multilayer preferably has between 2 and 10 Co/X bilayers. The $H_k$ in the Co/X multilayer is highest for thin Co layers in a thickness range of 0.1-0.4 nm. Also, Co/Ni bilayers will generally provide a lower $H_k$ than Co/Pd and Co/Pt bilayers. The anisotropy field $H_k$ of the Co/X multilayer is less than the $H_k$ for the FePt layer and is preferably between about 1 and 40 kOe. The soft magnetic layer may also be Co, a CoPtCr alloy or a CoPtCr-oxide magnetically soft material (coercivity less than about 2000 Oe) with a thickness between 0.5 to 10 nm and a high-saturation magnetization (Ms greater than about 600 emu/$cm^3$). An optional intermediate coupling layer, like a thin layer of Pt, Pd, Ru, Ni, Ta or CoRu, may be located between the higher-$H_k$ FePt layer and the lower-$H_k$ soft layer to tune the exchange coupling.

Perpendicular magnetic recording disks with BPM have been proposed primarily for use in conventional magnetic recording, wherein an inductive write head alone writes data to the islands. However, perpendicular BPM disks have also been proposed for use in heat-assisted recording, also called thermally-assisted recording (TAR). In a TAR system, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the inductive write head. The method of this invention can be used to make perpendicular BPM disks for use in TAR disk drives. FIG. 7 depicts a sectional view of a TAR disk made according to the method of the invention. The resulting disk is substantially identical to the disk shown in FIG. 4C except that a heat sink layer 270 is located below the FePt islands in layer 250 and below the recesses between the islands, and an optional thermal resist layer 280 may be located between the heat sink layer 270 and the FePt islands and the recesses between the islands. The heat sink layer 270 is formed of a material that is a good thermal conductor, like Cu, Au, Ag or other suitable metals or metal alloys. Optional thermal resist layer 280, such as a layer of MgO or $SiO_2$, helps control the heat flow so that heat is not distributed too rapidly into the heat sink layer 270. The TAR disk may also include an optional SUL, which if present would be located below the heat sink layer 270. If there is no SUL, then there is no need for an EBL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a patterned perpendicular magnetic recording medium comprising: providing a substrate; depositing on the substrate a recording layer that is not substantially chemically-ordered comprising Pt and an element selected from Fe and Co; depositing on the recording layer a sealing layer having substantially no chemical reactivity with the recording layer; annealing the recording layer to form a recording layer of a substantially chemically-ordered alloy having perpendicular magnetic anisotropy; removing the sealing layer after annealing; and patterning the recording layer into discrete islands.

2. The method of claim 1 wherein the patterning is performed after the removal of the sealing layer.

3. The method of claim 2 further comprising depositing a protective overcoat over the patterned islands.

4. The method of claim 1 wherein the patterning is performed after the deposition of the recording layer and before the deposition of the sealing layer.

5. The method of claim 4 further comprising, after removing the sealing layer, depositing a protective overcoat over the patterned islands.

6. The method of claim 1 further comprising heating the substrate to a temperature less than 400° C. during the deposition of the recording layer.

7. The method of claim 1 wherein the annealing is performed at a temperature greater than 400° C. and less than 800° C.

8. The method of claim 1 wherein depositing the sealing layer comprises depositing a sealing layer selected from alumina, silicon dioxide, a silicon nitride, a titanium nitride, and diamond-like carbon.

9. The method of claim 1 wherein removing the sealing layer comprises removing the sealing layer by reactive ion etching (RIE).

10. The method of claim 1 wherein depositing the recording layer comprises sputter depositing from a single target consisting essentially of Pt and said selected element.

11. The method of claim 1 wherein depositing the recording layer comprises alternately sputter depositing layers of Pt and said selected element.

12. The method of claim 1 wherein depositing the recording layer comprises depositing Pt and Fe in generally equal atomic amounts.

13. The method of claim 12 wherein depositing the recording layer further comprises depositing the element X selected from Ni, Au, Cu, Pd and Ag in an amount less than 20 atomic percent of the total amount of Pt, Fe and X.

14. The method of claim 1 further comprising, prior to patterning the recording layer into discrete islands, depositing on the recording layer a layer of soft magnetic material having an anisotropy field less than the anisotropy field of the recording layer.

15. The method of claim 14 wherein depositing a layer of soft magnetic material comprises depositing a multilayer selected from the group consisting of a multilayer comprising Co/Pt, a multilayer comprising Co/Pd and a multilayer comprising Co/Ni.

16. The method of claim 14 further comprising, prior to depositing the layer of soft magnetic material, depositing an intermediate coupling layer on the recording layer.

17. A method for making a patterned perpendicular magnetic recording disk comprising: providing a substrate; depositing on the substrate a seed layer for enhancing the growth of a subsequently deposited recording layer so as to encourage perpendicular magnetic anisotropy of the subsequently deposited recording layer; heating the substrate to a temperature less than 400° C.; depositing on the seed layer a recording layer that is not substantially chemically-ordered of material comprising generally equal atomic amounts of Fe and Pt; depositing on the recording layer a sealing layer having substantially no chemical reactivity with the material of the recording layer; annealing the recording layer to a temperature greater than 400° C. and less than 800° C. to form a recording layer of a substantially chemically-ordered FePt alloy in the L 10 phase; removing the sealing layer after annealing; and patterning the recording layer into discrete islands.

18. The method of claim 17 wherein the patterning is performed after the removal of the sealing layer.

19. The method of claim 18 further comprising depositing a protective overcoat over the patterned islands.

20. The method of claim 17 wherein the patterning is performed after the deposition of the recording layer and before the deposition of the sealing layer.

21. The method of claim 20 further comprising, after removing the sealing layer, depositing a protective overcoat over the patterned islands.

22. The method of claim 17 wherein depositing the sealing layer comprises depositing a sealing layer selected from alumina, silicon dioxide, a silicon nitride, a titanium nitride, and diamond-like carbon.

23. The method of claim 17 wherein depositing the recording layer comprises sputter depositing from a single target comprising generally equal atomic amounts of Fe and Pt.

24. The medium of claim 17 wherein depositing the recording layer comprises alternately sputter depositing layers of Fe and Pt.

25. The method of claim 17 wherein depositing the recording layer further comprises depositing the element X selected from Ni, Au, Cu, Pd and Ag in an amount less than 20 atomic percent of the total amount of Fe, Pt and X, and wherein annealing the recording layer forms a recording layer of a substantially chemically-ordered pseudo-binary FePtX alloy in the $L1_0$ phase.

26. The method of claim 17 further comprising, prior to patterning the recording layer into discrete islands, depositing an intermediate coupling layer on the recording layer and a layer of soft magnetic material having an anisotropy field less than the anisotropy field of the recording layer on the coupling layer.

27. The method of claim 26 wherein depositing a layer of soft magnetic material comprises depositing a multilayer selected from the group consisting of a multilayer comprising Co/Pt, a multilayer comprising Co/Pd and a multilayer comprising Co/Ni.

* * * * *